April 27, 1965 J. E. GUTRIDGE 3,180,285
RAILWAY VEHICLE DECK STRUCTURE
Filed Nov. 23, 1962 4 Sheets-Sheet 1
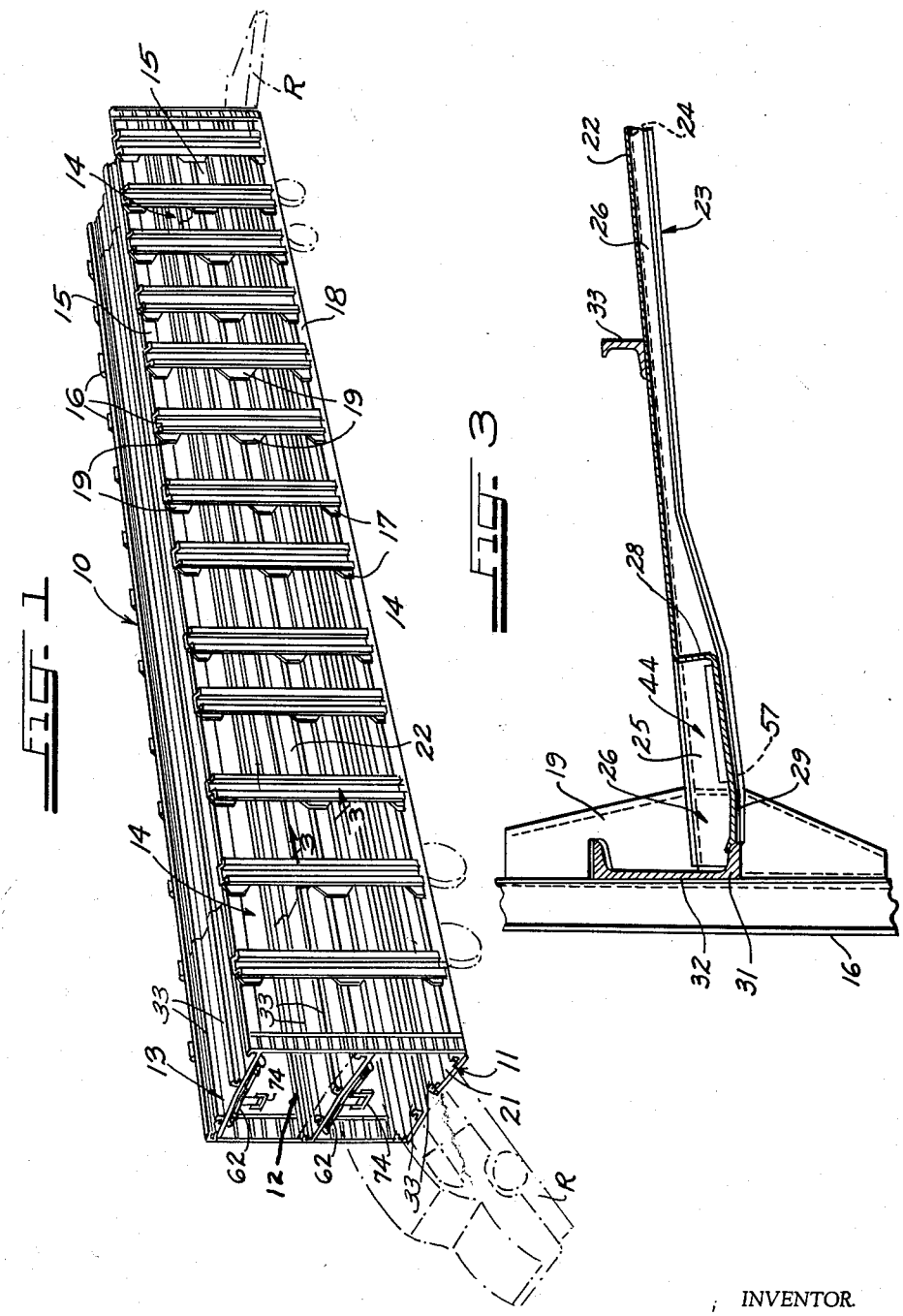
INVENTOR.
JACK E. GUTRIDGE
BY
Wayne Morris Russell

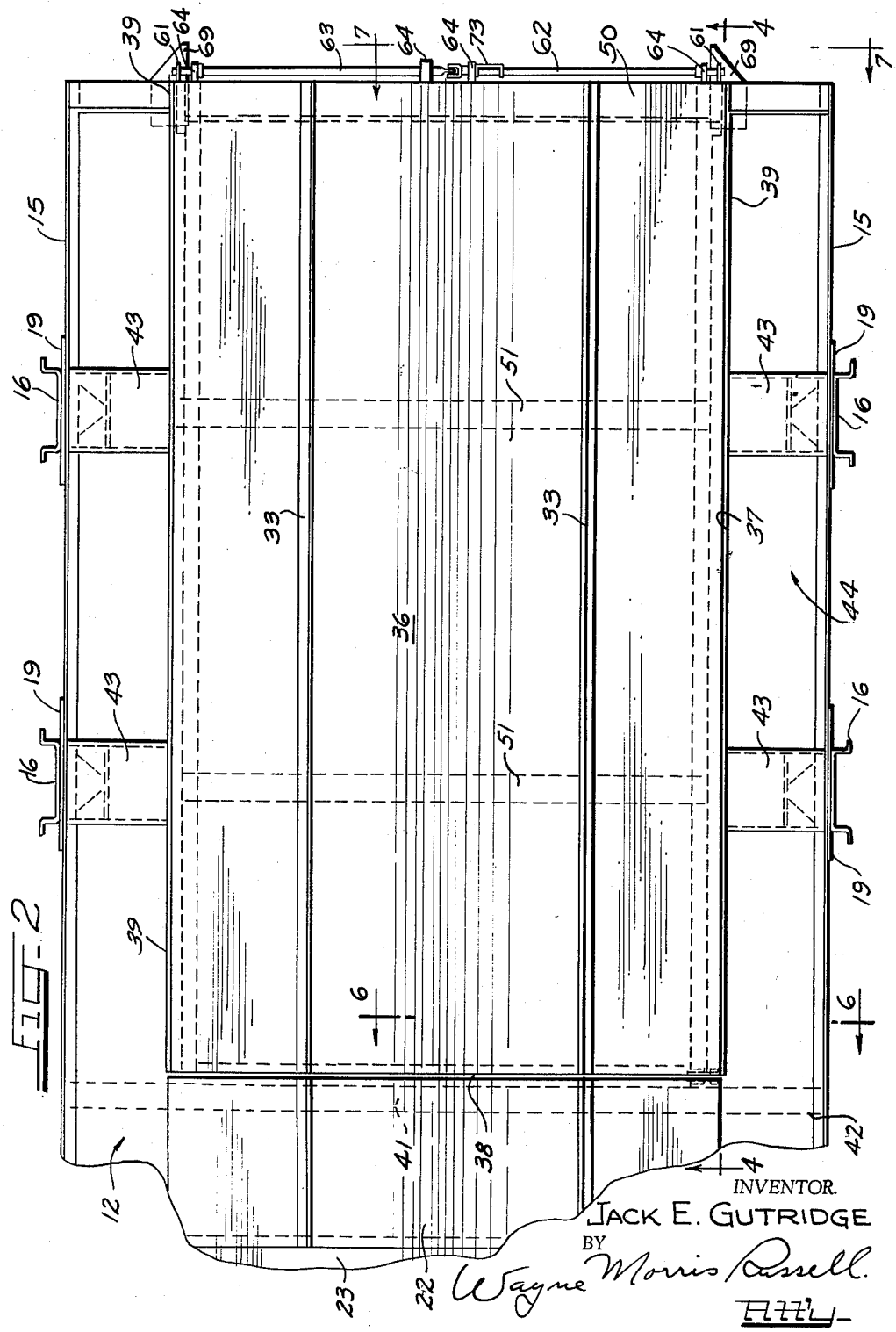

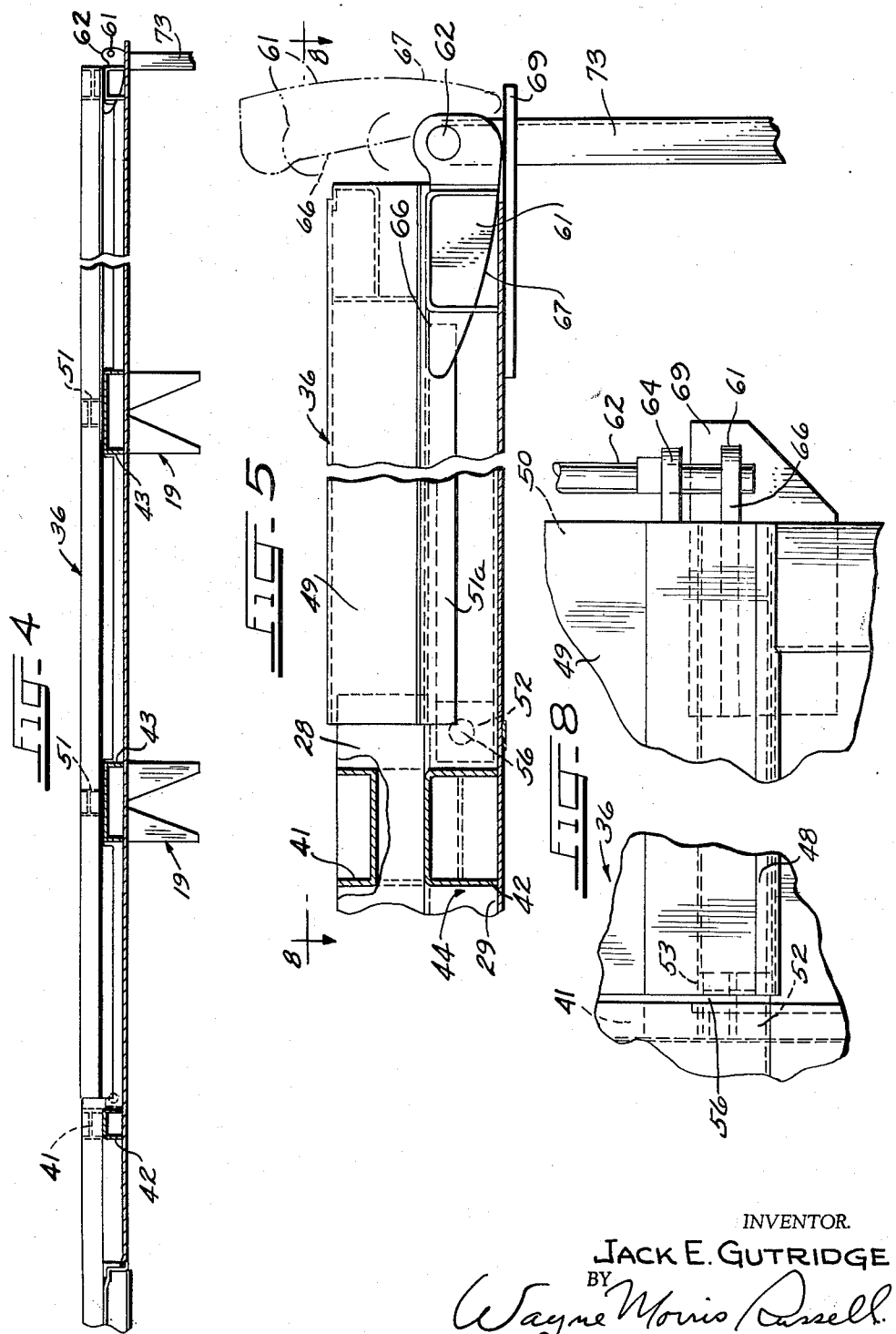

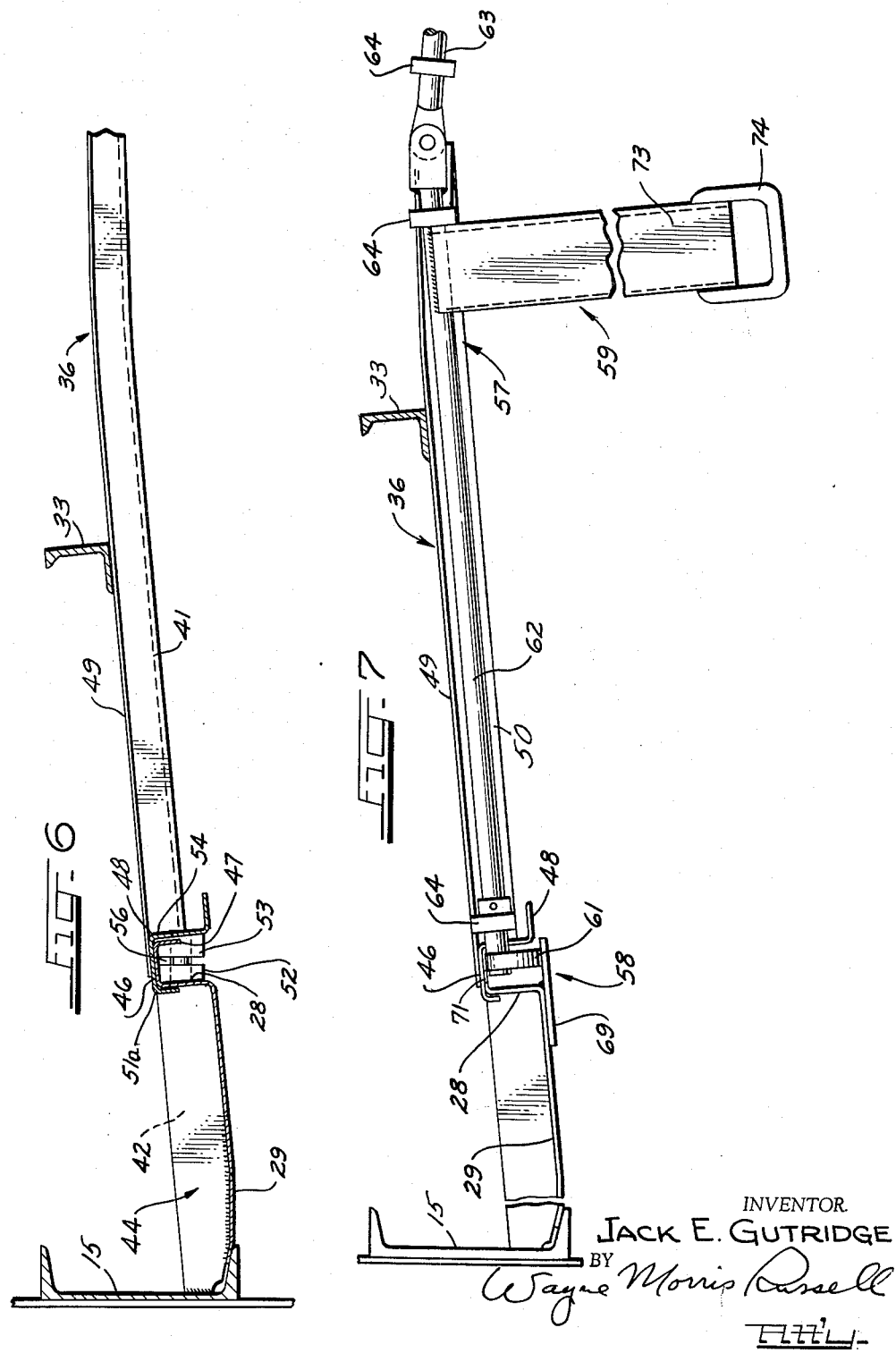

United States Patent Office 3,180,285
Patented Apr. 27, 1965

3,180,285
RAILWAY VEHICLE DECK STRUCTURE
Jack E. Gutridge, Dyer, Ind., assignor to Pullman Incorporated, Chicago, Ill., a corporation of Delaware
Filed Nov. 23, 1962, Ser. No. 239,742
3 Claims. (Cl. 105—368)

The present invention relates to multi-deck railway vehicles for transporting automotive vehicles and more particularly to an upper deck structure constructed and arranged so that the end portions thereof are vertically displaceable to provide clearance during loading and unloading of the automotive vehicles on the immediate underlying deck.

Multi-deck railway vehicles employed for the purpose of transporting automotive vehicles are limited as to their overall height above the track level so that when they are loaded adequate clearance is provided between overhead obstacles such as tunnels, overhead power lines and the like encountered during transit. To this end the vertical spacing between the decks is usually maintained at the minimum required to accommodate the automotive vehicles therebetween. Conventionally, the automotive vehicles such as passenger cars, trucks, trailer tractors and the like are loaded and unloaded from the multi-deck vehicle by way of inclined ramps positioned at the ends of the car. Thus when the decks are spaced at a minimum to accommodate the automotive vehicle in its normal loaded position during loading and unloading thereof by way of the inclined ramp the automotive vehicle is correspondingly inclined such that its top may not clear the immediately overlying deck.

It is an object of the present invention to provide a multi-deck railway vehicle structure for transporting automotive vehicles wherein the deck spacing is maintained at a minimum with an upper deck structure having end sections constructed and arranged to normally provide an automotive vehicle support and to be vertically displaceable during loading and unloading of automotive vehicles on the immediately underlying deck.

It is further object to provide a multi-deck railway vehicle structure for transporting automotive vehicles wherein the deck spacing is maintained at a minimum with an upper deck structure including pivotal end sections movable from a normal automotive vehicle support in a position to an upwardly inclined position providing clearance for automotive vehicles being loaded and unloaded on the underlying deck.

It is still a further object to provide a hinged end deck structure for a deck of a multi-deck railway vehicle including means readily accessible from the end of the car for selectively positioning the hinged deck section between a normal automotive vehicle support position and a raised position.

Further objects and features will hereinafter appear.

In the drawings:

FIG. 1 is a perspective view of a multi-deck railway car embodying the upper deck structure of the present invention.

FIG. 2 is a fragmentary top plan view of one end of the upper decks of the multi-deck car of FIG. 1.

FIG. 3 is a cross-sectional view taken substantially along the lines 3—3 of FIG. 1.

FIG. 4 is a cross-sectional view taken generally along the lines 4—4 of FIG. 2.

FIG. 5 is an enlarged fragmentary view of FIG. 4 showing the means employed to elevate the hinged deck section.

FIG. 6 is a cross-section view taken substantially along the lines 6—6 of FIG. 2.

FIG. 7 is a fragmentary end elevational view of the upper deck taken generally along the lines 7—7 of FIG. 2.

FIG. 8 is an enlarged fragmentary top plan view taken generally along the lines 8—8 of FIG. 5 and along one side of the hinged deck section of the upper deck.

Referring now to the drawings, there is shown a multi-deck railway vehicle 10 including a lower deck 11 and upper decks 12 and 13 and open frame sides 14. The sides 14 each comprise a plurality of upright posts or channels 16 fastened as by gussets 17 at their lower ends to lengthwise extending bottom side channels 18 and adjacent their upper ends and intermediate the upper and lower ends to lengthwise extending channels 15 as by bracket gusset arrangements 19.

Disposed between and fixed to bottom side channels 18 is a deck sheet 21 forming the lower deck 11. The web or deck sheet 21 and channels 18 may be suitably mounted on the usual underframe including the usual bolsters and cross bearers (not shown).

The upper decks 12 and 13 are of identical structure each including a web or sheet 22 suitably braced by a plurality of transversely extending braces 23 spaced lengthwise of the car and fixed at their respective ends to the bracket gussets 19 as by welding. The transverse braces 23 are of substantially hat shaped section and the deck web is formed from a plurality of sheets fixed on the horizontal webs 24 of the braces 23 in end-to-end relationship. The outer ends of the braces 23 are formed with vertical webs 25 of greater depth than the vertical webs 26 of the intermediate portion thereof. The enlarged brace section 24 lies outboard of the intermediate brace portion 26 on which the wheels of the automotive vehicles are adapted to be supported. The outboard portion of the deck sheets 22 in the region of the enlarged end brace section 24 are off-set with respect to the intermediate or cargo carrying portion of the deck sheets and includes a downwardly depending vertical web portion 28 and a horizontal web portion 29. The offset horizontal web 29 and the vertical web 28 will hereinafter for convenience be designated as the offset deck section or portion 44. The downwardly depending vertical webs 28 are fixed as by welding between adjacent braces 23 and impart longitudinal rigidity to the upper deck and the horizontal webs 29 are fixed to the flanges 31 of the side channels 32.

Extending lengthwise of the upper decks 13 is a pair of bulb angles 33 spaced so as to accommodate the average lateral wheel spacing of the automotive vehicles being hauled. The bulb angles 33 are fixed to the upper deck web sheets 22 as by welding and are continuous from end to end. With the bulb angles thus arranged additional longitudinal rigidity is imparted to the upper deck structure.

If desired, the upper deck side channels 15 may be detachably secured to the side posts by way of the gusset brackets 19 so as to be adjustably positioned thereon to accommodate automotive vehicles of different heights such as passenger cars, trucks or trailer tractors. Assuming for the purpose of explanation in the embodiment shown that the decks 12 and 13 are vertically spaced to accommodate passenger cars, and are positioned in as close proximity as possible with minimum clearance between the roof of the vehicle and the overlying deck so that overall height of the loaded railway vehicle is maintained at a minimum.

To load and unload the passenger cars a set of inclined ramps R is positioned at the ends thereof and cars driven thereon. When the vertical spacing between the decks 11 and 12 is maintained at a minimum it is obvious that as the passenger car is inclined on the ramps R that the angle of car may be such that the car roof collides with the overlying decks.

In accordance with the present invention the end portions of the deck are formed with a hinged deck section 36 which is arranged to be hinged at its inner end so that the outer end may be swung in an upward arc sufficiently to provide clearance between the passenger cars and the upper deck as the latter are being loaded or unloaded on the lower decks via the inclined ramps.

In the multi-deck railway car 10 used to illustrate the principles of the invention each of the decks are of sufficient length to accommodate four standard size passenger cars each having an average length of about 18 feet and 5 compact cars each having an average length of about 15 feet on a single deck. To accommodate this number of passenger cars the hinged deck section is utilized as a supporting deck and is required to have the rigidity and strength capable of assuming the load of a passenger car supported thereon. That is to say the hinged deck section in its normal position forms a portion of the deck capable of assuming the load of a passenger car.

The hinged or pivoted deck section 36 at the end of the upper decks are of identical structure so that only one hinged deck section need be described hereinafter. As shown in particular in FIG. 2 the end portion of the upper deck 12 is formed with a cut-out 37 defined by a transversely extending edge 38 of the deck web 22 and longitudinally extending edges 39 of the deck web 21 spaced inwardly of the upright posts 16. The transversely extending edge 38 is disposed inboard of the end of the car 10 between two adjacent upright side posts 16. Underlying the deck sheet 22 somewhat rearwardly of the transverse edge 38 between the vertical longitudinal extending webs 28 depending from the deck web 22 is an inverted channel 41 of relatively shallow section. The inverted channel 41 is fixed to the underside of the deck web 21 and at its ends to the deck sheet vertical webs 28 as by welding and is bent to conform to the transverse contour of the main deck braces 23. Aligned with the inverted channel 41 and extending between the outer wall of the vertical web 28 and the side channels 18 are channel members 42 of deeper section than the section of the inverted channel 41. The deep section channels 42 are fixed to the off-set horizontal webs 29 and to the vertical web 28 and side channels 32 as by welding. The aligned inverted channel 41 and channels 42 connected at the vertical web 28 thus extend continuously transversely of the deck 12 so as to impart transverse rigidity thereto adjacent the hinge location of the hinged deck section 36.

Extending inwardly from each of the upright side posts 16 and being supported thereon by way of the gusset brackets 19 are channels 43. Extending from the transverse brace 23 immediately inwardly of the transverse edge 38 and along each side of the cutout 37 are the off-set deck portions 44 of which the horizontal offset webs 29 are fixed to the bottom ends of the vertical flanges of channels and the horizontal webs 28 to the inboard ends of the channel. As shown in particular in FIGS. 6 and 7, the off-set deck portions 44 in the vicinity of the cut-out 37 are bent at the upper ends of the vertical webs to provide a rim 46 terminating in a downwardly depending vertical flange 47 which is spaced from the vertical web 28 and define the opposing longitudinal rims or edges 39 of the cut-out 37.

Nestingly overlying the rims 46 are channel members 48 of substantially Z-section extending along the sides of the hinged deck section 36. The hinged deck section includes a web sheet 49 fixed as by welding to the horizontal webs 51a of the Z channel members 48. Extending along the forward edge of the web sheet 49 and fixed to the underside is a transverse channel member 50. Disposed between the forward and rear edges of the hinged deck 36 are intermediate reinforcing channels 51 aligned with the respective channels 43.

For hingedly attaching the hinged deck sections 36 to the main deck section 12, as shown in particular in FIG. 6, there is provided at each of the inner corners of cut-out 37 a boss 52 which is fixed to the vertical web 28 and aligned with a boss 53 fixed to the vertical web 54 of the Z channel 48. Fixed in the boss 52 is one end of a pivot pin 56 of which the other end is turnably supported by the other boss 53. In this manner the deck section 36 is hingedly secured to the main deck portion 12.

Located along the outer or leading edge of the hinged deck section 36 is the deck elevating means 57 including a lifting means 58 and an actuating means 59. As shown in FIGS. 5, 7 and 8 the lifting means 58 includes a camming lifting lever 61 fixedly secured to the outer ends of shafts 62 and 63 which are respectively turnably supported in pivot lugs 64 projecting outwardly of and fixed to the outer reinforcing channel 50. The camming lever 61 is formed along one side 66 with a substantially straight edge and along its opposite side with a camming surface 67. The lever 61 is disposed so that the camming surface 67 engages a horizontal plate 69 extending from the underside of the off-set horizontal web 29 and beneath the rim 46 and the straight edge lies beneath a slot 71 formed in the horizontal web of the rim 46. The shafts 62 and 63 are connected at their inner ends by way of a clevis pin connection 72.

In the embodiment shown, the actuating means 59 for turning the lifting levers 61 is in the form of a strap 73 fixed at one end to one of the shafts 62 adjacent the clevis hinge connection 72. The other end of the strap is provided with a looped end 74.

In operation, a suitable hooked rod is inserted into the looped end 74 of the strap 73 and the latter is turned outwardly and upwardly whereby the interconnected shafts 62 and 63 turn counterclockwise as viewed in FIG. 5. At the same time the lifting levers 61 fixed to the respective ends of the shafts 62 and 63 also turn counterclockwise so that the camming surfaces 67 bearing against the horizontal plates 69 are operative to lift or elevate the hinged deck section 36 about its pivots 56 to its upper limit position as shown in phantom lines in FIG. 5. In the upper limit position of the hinged deck, the strap 73 assumes a substantially horizontal position and in this position the end of the strap 73 may be extended to abut against the outer edge of the deck section so as to preclude further turning movement thereof. In this manner the lifting levers 61 are also precluded from disengaging with the plate 69.

What is claimed is:

1. In a multi-deck railway vehicle an upper lading supporting deck including deck sheet means having an open-ended cut-out at each end thereof, said deck sheet means defining the longitudinal sides of said cut-out including side rims each having downwardly depending vertical web and a horizontal web extending outwardly from the lower end of said vertical web along the longitudinal sides of said cut-out, a tiltable deck section disposed in said cut-out, said deck section including side members fixed along the sides thereof and including a vertical flange spaced inwardly from said respective deck sheet vertical webs, pivot means connected to the inner ends of said deck sheet vertical webs and said side member vertical flanges for pivotal mounting said tiltable deck section in said cut-out, and camming means mounted on said tiltable deck section spaced lengthwise of said pivot means and engageable with said deck sheet means for elevating said tiltable deck section about said pivot means from a position substantially flush with said deck sheet means.

2. The invention as defined in claim 1 wherein an inwardly projecting ledge is fixed to said outwardly extending horizontal web of said longitudinal sides, and said camming means is turnably supported on said deck sheet means and disposed to engage said inwardly projecting ledge so that upon turning of said camming means in one direction tilts and raises the outer ends of said deck section about said pivot means and upon turning in the other direction said deck section lowers said deck section to a position substantially coplanar with said deck sheet means.

3. The invention as defined in claim 2 wherein said camming means are disposed between said sheet means vertical web and said side member vertical flange and said camming means is formed so as to hold said deck section locked against pivoting movement about said pivot means in the coplanar position thereof.

References Cited by the Examiner
UNITED STATES PATENTS

| | | | |
|---|---|---|---|
| 2,169,648 | 8/39 | Judd | 296—1 |
| 2,694,597 | 11/54 | Kunz | 296—1 |
| 2,878,052 | 3/59 | Stuart | 296—1 |
| 2,970,550 | 2/61 | Petterson | 105—366 |

OTHER REFERENCES

Article and illustration entitled "ACF Markets Cushioned Auto Racks" appearing on page 28 of the December 5, 1960, Railway Age.

LEO QUACKENBUSH, *Primary Examiner*.